United States Patent Office 3,707,517
Patented Dec. 26, 1972

3,707,517
ELIMINATION OF BROWN SCUM IN TETRA-
FLUOROETHYLENE POLYMER AQUEOUS
DISPERSIONS
David Alan Holmes, Vienna, W. Va., assignor to E. I. du
Pont de Nemours and Company, Wilmington, Del.
No Drawing. Filed Sept. 15, 1970, Ser. No. 72,500
Int. Cl. C08f 45/24
U.S. Cl. 260—29.6 F        5 Claims

ABSTRACT OF THE DISCLOSURE

The brown scum which forms on the surface of basic aqueous dispersions of tetrafluoroethylene polymer which contain nonionic surfactant for stabilizing the dispersion can be eliminated by adding an iron-solubilizing agent such as citric acid to the dispersion.

---

This invention relates to the elimination of brown scum that forms in certain aqueous dispersions of tetrafluoroethylene polymer.

Aqueous dispersions of tetrafluoroethylene polymer have long been useful for applying a coating, film, or impregnant to a substrate by contacting the substrate with the dispersion, removing the water, followed by heating the polymer to fuse or sinter it depending on its chemical nature. Such dispersions have been especially useful in fabricating the type of polytetrafluoroethylene which is known as dispersion polymer or fine powder as distinguished from the granular type of polytetrafluoroethylene.

Most aqueous dispersions have been supplied in the basic form, wherein the pH of the dispersion has been adjusted upwardly to greater than 7, in order to minimize corrosion of handling and fabricating equipment. In some cases surfactant has been added to the dispersion after polymerization to give it storage stability, and nonionic surfactants have become preferred for this purpose because of their relative ease of removal during heating to fuse or sinter the polymer. At the same time, processes for concentrating the aqueous dispersion have been developed involving the addition of both basic compound and nonionic surfactant to the dispersion to produce a supernatant clear water layer which is decanted to leave a concentrated layer of polymer dispersed in water, as described in U.S. Pats. Nos. 3,037,953 to Marks and Whipple and 3,301,807 to Hoashi. While most of the surfactant ended up in the decanted layer, leaving less than 4 percent surfactant based on the weight of polymer solids in the concentrated layer, additional nonionic surfactant was sometimes added to the concentrated layer to increase its content in the concentrated layer to 6 percent based on the weight of polymer solids.

With this coming together of the steps of adjusting the pH to greater than 7 and adding nonionic surfactant to the aqueous dispersion, has arisen the problem that a scum of brownish color formed on the surface of the dispersion during standing. Attempted removal of the brown scum by skimming has met with limited success, nevertheless this has been the method chiefly used for the past 15 years. Failure to remove all the scum has often resulted in the formation of dark specks in the final polymer product.

The present invention involves the discovery that the brown scum is caused by the presence of iron in the dispersion and that the brown scum can be eliminated by adding an effective amount of a solubilizing agent to the dispersion. That the brown scum is caused by iron is surprising because iron or a compound of iron such as iron hydroxide that could be formed in the basic dispersion would be expected to form at the bottom of the dispersion instead of on its surface.

Iron in the dispersion is believed to come from two major sources, from corrosion by the aqueous polymerization medium of the polymerization vessel and from the powdered iron intentionally added to the many polymerization media in order to increase the polymerization rate (as described in U.S. Pat. 2,750,350 to Kroll) even though not greater than 10 parts per million of the powdered iron based on the weight of the water present in the polymerization medium is added. However the brown scum occurs even when powdered iron is not added.

The tetrafluoroethylene polymer component of the dispersion is either the homopolymer thereof, i.e., polytetrafluoroethylene, or a copolymer thereof with sufficient other copolymerizable ethylenically unsaturated monomers to render the resultant copolymer melt fabricable, but usually no greater than 35 weight percent based on the weight of the copolymer. The homopolymer can be modified to include a small proportion of other monomer units short of rendering the polymer melt fabricable, e.g., up to 2 percent by weight of units derived from perfluoroalkyl ethylene or oxyperfluoroalkyl-trifluoroethylene of 3 to 10 carbon atoms, preferably hexafluoropropylene, as described in U.S. Pat. 3,142,665 to Cardinal, Edens and Van Dyk. Examples of copolymers in which sufficient comonomer is present to produce a melt fabricable copolymer include tetrafluoroethylene/hexafluoropropylene copolymers such as disclosed in U.S. Pat. 2,946,763 to Bro and Sandt, the copolymers of tetrafluoroethylene with higher perfluoroalkenes such as those containing from 4 to 10 carbon atoms, copolymers of tetrafluoroethylene with perfluoroalkyl vinyl ethers (such as perfluoro(propyl or ethyl) vinyl ethers disclosed in U.S. Pat. 3,132,123 to Harris and McCane, and the copolymer of tetrafluoroethylene with perfluoro-(2-methylene-4-methyl-1,3-dioxolane) disclosed in U.S. Pat. 3,308,107 to Selman and Squire, and the copolymers of tetrafluoroethylene with highly fluorinated monomers, i.e., in which a single hydrogen substituent remains which does not change the fluorocarbon character of the polymer, such monomers being 2-hydroperfluoroalkene containing 3 to 10 carbon atoms, i.e., 2-hydropentafluoropropene, the omega-hydroperfluoroalkenes from 3 to 10 carbon atoms, and the omega-hydroperfluoroalkyl perfluorovinyl ethers in which the alkyl group contains from 1 to 5 carbon atoms. The tetrafluoroethylene polymer component can also be a mixture of tetrafluoroethylene polymers, such as polytetrafluoroethylene with melt fabricable copolymers such as tetrafluoroethylene/hexafluoropropylene. The mixture can be made by blending dispersions of the polymers.

Briefly, a process for making the dispersion involves pressuring tetrafluoroethylene into an aqueous solution of polymerization initiator and dispersing agent under mild agitation to produce an aqueous dispersion of colloidal size particles of polytetrafluoroethylene in concentrations of 15 to 45 percent by weight of polymer solids. The result of the present invention does not depend on which polymerization initiator and dispersing agent are used so long as the end result obtained is the aqueous dispersion of polytetrafluoroethylene. Typically, however, the initiator will be a water-soluble peroxy compound such as the inorganic persulfates, e.g. ammonium persulfate, or organic peroxides, e.g. disuccinic acid peroxide, and the dispersing agent used during polymerization will be an anionic dispersing agent which imparts a negative charge to the polymer particles in the dispersion. The most used dispersing agents are the fluorinated carboxylic acids or carboxylates, e.g. ammonium polyfluorocarboxylates containing from 7 to 10 carbon atoms. The amount of dispersing agent often used is from 0.2 to 0.8 percent based on the weight of polymer solids. The dispersing agent can be added gradually to the polymerization medium during the early stage of polymerization to increase the particle size, as described in U.S. Pat. 3,391,099 to Punderson. Typically, the polymer particles will have an average particle diameter of 0.1 to 0.45 micron as measured by light scattering (U.S. Pat. 3,391,099).

The pH of the resultant aqueous dispersion will be about 3, and sufficient basic compound is added to the dispersion to increase its pH to at least 7 and preferably from 8 to 11. The compound will usually be an ammonium compound such as ammonium hydroxide or an ammonium salt such as ammonium carbonate, but any water soluble basic compound can be used. The basic compound is added in aqueous solution with the nonionic surfactant or after its addition.

The nonionic surfactant added to the dispersion is any nonionic surfactant which is soluble in water at room temperature (20–25° C.) at the concentration desired. The surfactant can be composed of a single nonionic surfactant of a mixture of nonionic surfactants. The nonionic surfactant preferably should have sufficient volatility so that at least 95 percent by weight of the surfactant is burned out of the polytetrafluoroethylene during its sintering which is generally done at a temperature in the range of 340 to 400° C. for 5 seconds to 10 minutes. Typically, such surfactants are prepared as reaction products of ethylene oxide with other compounds which impart hydrophobic moieties to the resultant surfactant, such as propylene oxide, amines, saturated and unsaturated alcohols and acids, and alkyl phenols. Other suitable nonionic surfactants which do not involve reaction with ethylene oxide but which can be used in the present invention are the alkanol amides and the fatty esters such as the methyl esters of caprylic, caproic, stearic, and oleic acids. For purposes of illustration, some of the foregoing described surfactants can be further described by the following formulae:

$$R[O(A)_nH]_x$$

wherein $A_n$ is the group $(C_2H_4O)_n$ or a mixture of the groups $(C_2H_4O)_a$ and $(C_3H_6O)_b$, wherein $n$ in each instance is an integer of from 2 to 50 and preferably 2 to 18, $b$ is an integer of 0 to 30, and $a$ is an integer of at least 2, $a$ and $b$ being equal to $n$; $x$ is an integer of 1, 2, or 3; and R is an aliphatic hydrocarbon group which can be saturated or unsaturated, straight-chain, branched, or cyclic, and will generally contain from 8 to 24 carbon atoms, preferably from 8 to 18 carbon atoms; examples of R groups include oleyl, stearyl, tridecyl, lauryl, decyl and the groups derived from aliphatic glycols and triols;

$$R'—C_6H_4O(B)_mH$$

wherein B is the group $(C_2H_4O)_m$ or a mixture of the groups $(C_2H_4O)_c$ and $(C_3H_6O)_d$ wherein $m$ in each instance is an integer of from 2 to 50 and preferably 8 to 20, $d$ is an integer of 0 to 30, $c$ is an integer of at least 2 and $c$ plus $d$ being equal to $m$; R' is a monovalent aliphatic hydrocarbon group, either straight-chained or branched and usually saturated and containing 4 to 20 carbon atoms and preferably 8 to 12 carbon atoms;

and

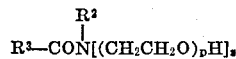

wherein $p$ is an integer 2 to 50, $z$ is an integer of 1 or 2, $R^3$ is an alkyl group containing 1 to 8 carbon atoms, $R^2$ is a chemical bond to a group $(CH_2CH_2O)_pH$ when $z$ is 2 and an alkyl group of 1 to 8 carbon atoms when $z$ is 1, with the proviso that at least 6 carbon atoms are provided by $R^2$ plus $R^3$; the polyalkylene oxide block polymers of the formula $$HO(C_2H_4O)_e(C_3H_6O)_f(C_2H_4O)_gH$$

where $f$ is an integer of from 15 to 65 and $e$ and $g$ are integers sufficiently large that $e$ plus $g$ total 20 to 90 percent of the total weight of the polymer. For each of the surfactants of the foregoing described formulae, the hydrophobic and hydrophilic moieties are proportioned and the total molecular weight is such that the aforementioned requirement of water solubility is met and preferably that the aforementioned degree of volatility is also met.

Additional specific surfactants include $$CH_3(CH_2)_4CH_2(OCH_2CH_2)_3OH$$

$$CH_3(CH_2)_6CH_2(OCH_2CH_2)_3OH$$

$$CH_3(CH_2)_{10}CH_2(OCH_2CH_2)_{12}(OCH(CH_3)CH_2)_5OH$$

$$CH_3(CH_2)_8CH_2(OCH_2CH_2)_{10}OH$$

$$CH_3(CH_2)_8CH_2(OCH_2CH_2)_5OH$$

and

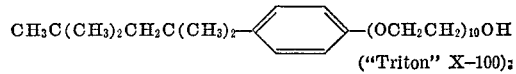

("Triton" X–100);

The adjustment of pH and addition of nonionic surfactant can be done to the dispersion as-polymerized or in connection with the Marks and Whipple or Hoashi concentration processes. In any event, the concentration of nonionic surfactant in the dispersion should be sufficient to stabilize the dispersion during storage. Generally from 1 to 15 percent, and more often 4 to 9 percent, of nonionic surfactant based on the weight of polymer solids in the dispersion will be present in the dispersion in which brown scum forms upon standing.

If either the pH is not adjusted or the nonionic surfactant not added, i.e., an anionic surfactant is added instead, the brown scum does not form. The brown scum has been found to contain iron, and as little as 0.5 p.p.m. of iron in the dispersion leads to the formation of the scum. The form of the iron in the brown scum is not certain; it is believed to be a complex with the nonionic surfactant and possibly hydroxide ion as indicated by the requirement that each of these elements be present in the dispersion for the brown scum to form.

The quantity of solubilizing agent that is added to the dispersion should be that which is effective to eliminate the brown scum, i.e., cause it to disappear; such amount will depend on the amount of brown scum that is present and the particular solubilizing agent used. Typically, from 0.001 to 2 percent of solubilizing agent will be required for this purpose and more often 0.005 to 0.1 percent thereof will be all that is required. Preferably, the amount of solubilizing agent added, if acidic, is insufficient to lower the pH of the dispersion to less than 7. The percent solubilizing agent is based on the weight of polymer solids in the dispersion. Usually the dispersion will contain from 40 to 75 percent percent polymer solids based on the weight of the dispersion.

Any compound which has a solubilizing effect on iron by complexing or otherwise, can be used as the solubilizing agent for the brown scum. Examples of solubilizing agents include acetic acid derivative of alkylene diamine and salts thereof and alkali metal fluorides. Specific solubilizing agents include oxalic acid, malonic acid, citric acid, tartaric acid, ammonium triacetic acid, ethylenediamine tetracetic acid and salts thereof such as the sodium salt commonly known as Versene, ethylenediamine diacetic acid, ethylenediamine, diethylenetriamine, 1,2-propanediamine and sodium fluoride.

The solubilizing agent is added to the dispersion by itself or in the form of a concentrated aqueous solution accompanied by mild stirring of the dispersion so as not to cause coagulation. The solubilizing agent can be added to the dispersion before or after formation of the brown scum to eliminate the scum.

The resultant dispersion is useful in the same manner as the aqueous dispersions of tetrafluoroethylene polymer heretofore.

Examples of the present invention are as follows (parts and percentages are by weight unless otherwise indicated):

EXAMPLE 1

The indicated amounts, based on polymer solids, of the solubilizing agents listed in the table were added to 100 ml. of polytetrafluoroethylene aqueous dispersion which contained a typical amount of brown scum. The dispersion was 60 percent polymer solids based on the weight of the dispersion, the polymer solids were in the form of negatively charged particles (by virtue of the dispersing agent during polymerization) having an average particle diameter of 0.20 micron. The dispersion contained 6 percent of "Triton" X-100 nonionic surfactant based on the weight of polymer solids and had a pH of 9.5 obtained by adding NH$_4$OH to the dispersion after addition of the surfactant thereto. The complexing agent was added either directly or as a solution in 1 to 2 ml. of water. These dispersion samples were stirred briefly and then rolled for 10 minutes. The viscosity was then checked. If it was above 25 centipoises, water was added to lower the viscosity to this value. Brown scum was present in the control sample (no solubilizing agent), and the absence of brown scum on a sample containing the solubilizing agent indicated that the scum was dissolved.

TABLE

| Sample | Additives | Wt. percent (based on polymer solids) | Presence of brown scum |
|---|---|---|---|
| a | None | | Yes. |
| b | Citric acid | 1.5 | No. |
| c | Oxalic acid | 1.5 | No. |
| d | Tartaric acid | 1.5 | No. |
| e | Potassium fluoride | 1.5 | No. |
| f | Versene | 1.5 | No. |

The composition of sample b was repeated except that the citric acid concentration was decreased to 0.01 percent based on the weight of polymer solids, and the brown scum was solubilized as indicated by its disappearance.

EXAMPLE 2

Following the procedure described in Example 1, 0.1% citric acid (polymer solids basis) was added to an aqueous dispersion of tetrafluoroethylene/hexafluoropropylene copolymer (hexafluoropropylene content about 16 percent by weight) and having a pH of about 9.5. The dispersion contained 55 percent polymer solids having an average particle diameter of 0.15 micron and containing 6 percent "Triton" X-100. No brown scum was observed on this sample after this addition although scum was present on the original dispersion which did not contain citric acid.

EXAMPLE 3

Following the procedure described in Example 1, 0.1% citric acid (polymer solids basis) was added to the dispersion of Example 1 which was stabilized wtih 1.75 percent "Alfonic" 1012-60 and 7.5 percent DN-65 based on polymer solids instead of "Triton" X-100. The dispersion had a pH of about 9.5. No scum was observed in this dispersion although scum was present in the same dispersion which did not contain any citric acid. "Alfonic" 1012-60 and DN-65 surfactants have the formulae $$CH_3(CH_2)_8CH_2(OCH_2CH_2)_5OH$$

and $$CH_3(CH_2)_xCH_2(OCH_2CH_2)_y(OC_3H_6)_zOH$$

wherein $x$, $y$ and $z$ are 10 to 11, 12 to 13, and 4 to 5, respectively.

As many apparently widely different embodiments of this invention may be made without departing from the spirit and scope thereof, it is to be understood that this invention is not limited to the specific embodiments thereof except as defined in the appended claims.

I claim:

1. An aqueous dispersion consisting essentially of tetrafluoroethylene polymer particles dispersed in water, said aqueous dispersion having a pH of greater than 7 and containing nonionic surfactant as the dispersing agent for said particles in said water and an effective amount of solubilizing agent for iron to eliminate the formation of brown scum on the surface of the dispersion, said effective amount being from 0.001 to 2 percent based on the weight of said polymer particles, said solubilizing agent being an acetic acid derivative of alkylene diamine and sodium salts thereof, alkali metal fluoride, oxalic acid, malonic acid, citric acid, tartaric acid, ammonium triacetic acid, ethylene diamine, diethylenetriamine, or 1,2-propane diamine.

2. The aqueous dispersion of claim 1 wherein the polymer is polytetrafluoroethylene.

3. The aqueous dispersion of claim 1 wherein the acid is citric acid.

4. The aqueous dispersion of claim 1 wherein the polymer solids content of said dispersion is 40 to 75 percent based on the weight of the dispersion.

5. The aqueous dispersion of claim 4 wherein its pH is from 8 to 11 and the nonionic surfactant content is from 4 to 9 percent based on the weight of polymer solids.

References Cited

UNITED STATES PATENTS

| | | | |
|---|---|---|---|
| 3,271,341 | 9/1966 | Garrison | 260—29.6 F |
| 3,301,807 | 1/1967 | Hoashi | 260—29.6 F |
| 3,316,201 | 4/1967 | Hahn et al. | 260—29.6 F |
| 3,489,595 | 1/1970 | Brown | 260—29.6 F |
| 2,937,156 | 5/1960 | Berry | 260—29.6 F |
| 3,006,881 | 10/1961 | Bolstad et al. | 260—29.6 F |
| 3,037,953 | 6/1962 | Marks et al. | 260—29.6 F |
| 3,391,099 | 7/1968 | Punderson | 260—29.6 F |

HAROLD D. ANDERSON, Primary Examiner

U.S. Cl. X.R.

260—29.6 PT, 29.6 ME, 29.6 MN